(12) United States Patent
Bharathan

(10) Patent No.: US 11,983,060 B2
(45) Date of Patent: May 14, 2024

(54) SYSTEMS AND METHOD FOR ALWAYS-ON SENSING USER INTERFACE

(71) Applicant: Cypress Semiconductor Corporation, San Jose, CA (US)

(72) Inventor: Vibheesh Bharathan, Pleasanton, CA (US)

(73) Assignee: Cypress Semiconductor Corporation, San Jose, CA (US)

(*) Notice: Subject to any disclaimer, the term of this patent is extended or adjusted under 35 U.S.C. 154(b) by 32 days.

(21) Appl. No.: 17/967,735

(22) Filed: Oct. 17, 2022

(65) Prior Publication Data

US 2023/0122105 A1 Apr. 20, 2023

Related U.S. Application Data

(60) Provisional application No. 63/256,244, filed on Oct. 15, 2021.

(51) Int. Cl.
*G06F 1/324* (2019.01)
*G06F 1/3228* (2019.01)
*G06F 1/3234* (2019.01)

(52) U.S. Cl.
CPC ............ *G06F 1/324* (2013.01); *G06F 1/3228* (2013.01); *G06F 1/3262* (2013.01)

(58) Field of Classification Search
CPC ....... G06F 1/3228; G06F 1/324; G06F 1/3262
See application file for complete search history.

(56) References Cited

U.S. PATENT DOCUMENTS

| | | | |
|---|---|---|---|
| 2008/0277171 A1* | 11/2008 | Wright | G06F 3/042 178/18.06 |
| 2017/0053152 A1* | 2/2017 | Medina | H04W 52/0251 |
| 2022/0113855 A1* | 4/2022 | Bharathan | G06F 3/04166 |

* cited by examiner

Primary Examiner — Terrell S Johnson

(57) ABSTRACT

Disclosed are sensing systems and methods that eliminate CPU intervention or interrupts when performing sensor scans of a touch interface, supports low power sensing operation without requiring periodic wake up of the CPU, and is scalable to multi-channel or multi-chip sensor configuration to support large touch screens or a high number of sensors. Sensor scanning is configured and controlled by an autonomous engine and comparison is completed by wake-up detection logic, operable without CPU interaction.

20 Claims, 5 Drawing Sheets

SYSTEMS AND METHOD FOR ALWAYS-ON SENSING USER INTERFACE

RELATED APPLICATIONS

This application claims the benefit of U.S. Provisional Application No. 63/256,244, filed on Oct. 15, 2021, which is incorporated by reference herein in its entirety.

TECHNICAL FIELD

The subject technology generally relates to sensor technology, and more particularly, to methods and systems for low power scan of sensors such as capacitive, inductive, magnetic, current, voltage sensors used in touch screens or other sensing applications.

BACKGROUND

Highly integrated electronic circuits that integrate touch sensing interface, wireless connectivity, audio processing, and multimedia display are used in a wide variety of applications. The touch sensing interface may be a slider, touchpad, or a touch screen that employs a matrix of capacitive sensors. To detect user interface through the touch sensing interface, CPU interaction may be needed to scan the matrix of capacitive sensors, referred to as a frame of scan. For example, the CPU may perform interconnection of electrodes and configure sensor parameters such as block configuration, course and fine initialization, scanning resolution, etc., before commanding the sensors to initiate the scan. Each of the sensors may successively perform the scan for the frame. When a sensor completes its scan, the sensor may generate an interrupt for the CPU to read and convert the results of the scan and for the CPU to configure and command the next sensor in the frame. At the end of the frame, the CPU may process the scanned results to detect the user input. The scanning of the frame of sensors may repeat with a period. The repetitive interrupt handling and configurations of each sensor in the frame requires significant CPU bandwidth, degrading the system performance of the electronic circuit that also performs other functions such as wireless communication, audio processing, graphics display, etc. Solutions to reduce the CPU interaction for servicing touch sensing interface may include using dedicated hardware. However, dedicated hardware increases die area, power, and cost.

In other applications, the touch sensors may be used in low power applications such as in battery powered devices. To conserve power at the system level, the device may be put in a sleep mode. However, to perform a scan, device resources external to the touch sensors such as the CPU, bus access, and IO interconnections may need to be in the active power domain. The device may operate a periodic scan in which the CPU is put into a sleep mode and periodically wakes up to monitor user interaction in an active mode. The need for the device to periodically wake up limits the extent of power optimization. To reduce the average power consumption, the interval for the sleep mode may be lengthened, which adversely results in longer touch to system detection latency and reduced display refresh rate. Solutions to satisfy low power applications without performance degradation may include using dedicated hardware, but these solutions may be restricted in the type of sensors used, may not be scalable, and may have limited capacitance range. It is desirable for sensor scanning solutions in highly integrated devices that reduce the CPU bandwidth needed to support scanning a frame, conserve device power, while providing the flexibility to fine tune performance.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION

Examples of various aspects and variations of the subject technology are described herein and illustrated in the accompanying drawings. The following description is not intended to limit the invention to these embodiments, but rather to enable a person skilled in the art to make and use this invention. For example, while examples, implementations, and embodiments of the subject technology are described using capacitive sensors of a touch screen panel, the subject technology is not thus limited and may be applicable to other types of sensor technologies or sensor applications using other types of sensors such as inductive, magnetic, current, voltage sensors.

In multi-functional devices with touch sensing capability, the touch sensing interface may include a matrix of capacitive sensors arrayed on a surface such as a touch pad or touch screen. To detect user interaction on the touch sensing interface, a device may scan the sensors to obtain sampled values for a specific sensor configuration. Typically, the device may scan a frame of sensor over multiple sensor configurations by moving from sensor to sensor over multiple scans. Existing solutions require significant interaction by a CPU of the device to support a frame of sensor scan, leading to consumption of CPU bandwidth that may otherwise be utilized to implement other functions of the device, resulting in degraded system performance and increased power consumption.

Figure 1:
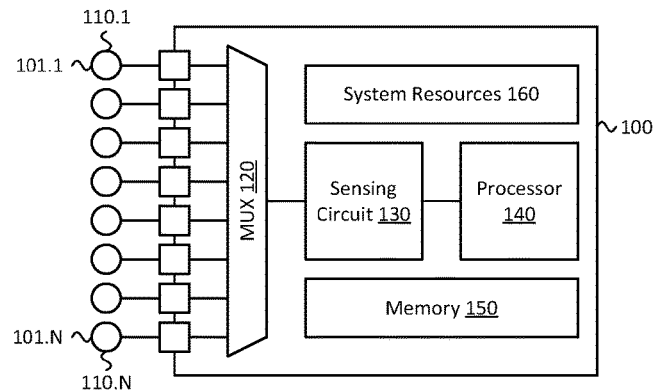
FIG. 1 illustrates a device configurable to measure and digitize characteristics on a plurality of sensing electrodes, according to embodiments.

FIG. 1 illustrates one embodiment of a device 100 for scanning a plurality of sensors 101.1-101.N. Sensors 101.1-101.N may be coupled to IOs 110.1-110.N and may be used to measure different physical characteristics, including but not limited to capacitance, inductance, impedance, and resistance. Device 100 may include a multiplexer for coupling IOs 110.1-110.N to sensing circuit 130. While one multiplexer and one sensing circuit is shown, multiple multiplexors and/or multiple sensing circuits may be implemented. Sensing circuit may be configured to provide a digital representation of the physical characteristic measurable by the sensors to a processor 140 or processing logic. Device 100 may also include a memory 150 for storing data corresponding to the sensors, parameters used in the digital conversion, instructions for execution by the processor, or data used in decision-making by the processor with regard to the measured values. Device 100 may also include system resources 160, including reference voltages, oscillators for different modes of operation, and other elements that may be used by various device circuits during operation.

Figure 2:
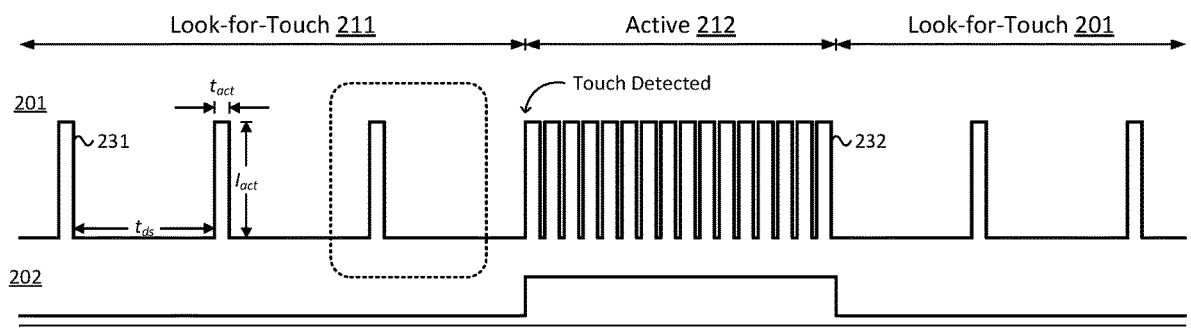
FIG. 2 current consumptions based on mode of a device, according to embodiments.

FIG. 2 illustrates power consumption curves for operation of a device (such as device 100 of FIG. 1) capable of capacitance sensing and other functions. Sensing may operate in a plurality of modes, including look-for-touch mode 211 and active mode. In look-for-touch mode the device may wake up portions of the device to perform a scan and then power down those portions once the scan is complete. Instantaneous power consumption 201 may increase to meet application demands. Average power consumption 202 may be minimized by maintaining a sleep state (or a deep sleep state) when not scanning electrodes. In active mode 212, multiple successive scans (232) of electrodes may occur without putting the device back into a sleep state (or deep sleep state). Active mode 212 may be triggered when a touch is detected. One or ordinary skill in the art would understand that a change in state may also be triggered when a change in capacitance indicative of a conductive object in proximity to sensing electrodes is detected. Once a touch (or conducive object in proximity to sensing electrodes) is no longer detected, the device may return to the look-for-touch mode.

In look-for-touch mode 211, during scan operation 231, only the circuit elements that are necessary for sensing may be activated. In various embodiments the sensing block may be on continuously or powered on only when sensing. However, other circuit elements that are not used for sensing may remain powered down, conserving power and reducing total average power consumption. Therefore, in look-for-touch mode 212, intervention by a processor may not be required to perform a scan or to detect a touch event, thus reducing the overall power requirements. The sensing block and digital logic may power on, scan electrodes, and detect the presence of a touch or conductive object, and activate the rest of the device or power down without processor input.

Figure 3A:
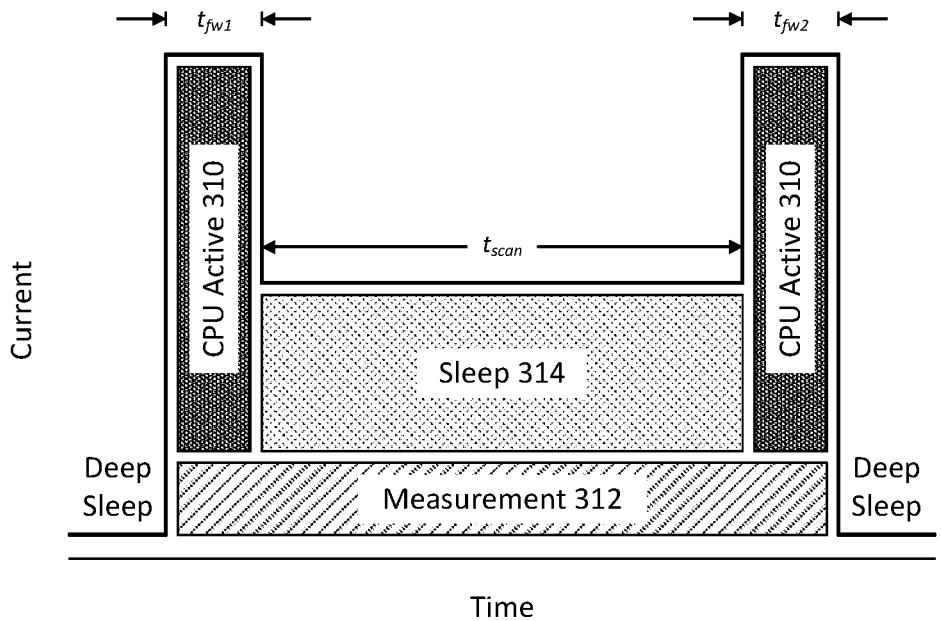
FIGS. 3A and 3B illustrate power consumption curves during scan operation of a device, according to embodiments.

FIGS. 3A and B illustrate power consumption for measurement with different profiles. FIG. 3A illustrates a scan (or measurement) corresponding to scan operations 231 or 232 of FIG. 2. A device may wake from deep sleep and enter an active mode for a time, $t_{fw1}$, during which CPU active current 310 and measurement current 312 are drawn. During a time $t_{scan}$, the CPU may be put to sleep, reducing the current draw to sleep 314, which measurement current 312 is still drawn. Finally, at the end of $t_{scan}$, the CPU may wake again for a time, $t_{fw2}$, during which CPU active current 310 and measurement current 312 are drawn again. The device may then enter deep sleep. In this embodiment, the total power consumption of the device includes extraneous operations of the CPU and sleep (low power) circuitry.

Figure 3B:
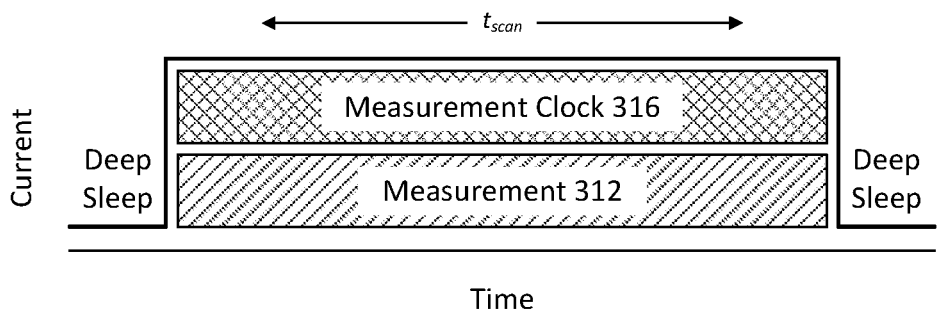

FIG. 3B illustrates an embodiment wherein, during loof-for-touch or active scanning, the necessary circuit for scanning (only) is powered on, thus reducing the power draw. Measurement current 312 and the necessary clock resource (measurement clock 316) are powered on and basic logic may be performed to determine if a touch or other triggering event has occurred with may signal the device to turn on other system components or features.

Figure 4:
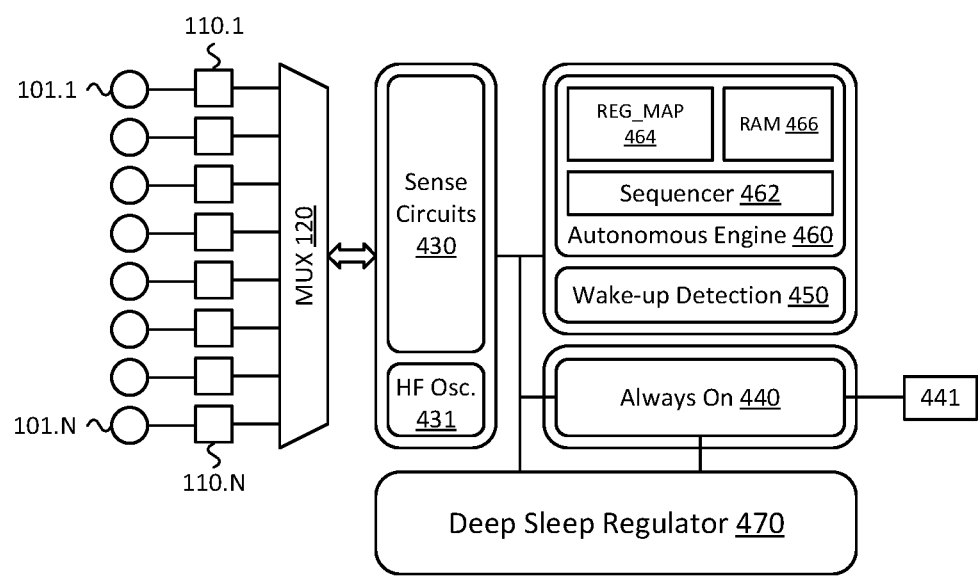
FIG. 4 illustrates a device configurable to measure and digitize characteristics on a plurality of sensing electrodes and monitor characteristics in a low-power state, according to embodiments.

FIG. 4 illustrates an embodiment of a circuit capable of sensing changes on multiple inputs. Circuit 400 may include portions of circuit 100 of FIG. 1. In other embodiments, circuit 400 may be part of a larger system including those circuit elements of circuit 100. Circuit 400 may be coupled to a one or more sensors 401.1-401.N via IOs 410.1-410.N. IOs 410.1-410.N may be coupled to sensing circuit (or sensing block) 430 through a multiplexer 420, control of which may be provided by digital logic (not shown). Sensing block 430 may be configured to convert a signal received on IOs 410.1-410.N to a digital value representative of a physical characteristic of sensors 401.1-401.N coupled thereto. Physical characteristics may include capacitance, resistance, inductance, impedance, or other such characteristics. Such a list is not intended to be limiting or exhaustive. Sensing block 430 may also include a high-frequency oscillator 431 for providing clocking to sensing block 430 for use in the conversion of signals to digital values. High-frequency oscillator 431 may be included in the block in one embodiment. In another embodiment, high-frequency oscillator 431 may be located elsewhere on an integrated circuit (IC), such as in the system resources block 160 of FIG. 1, and routed to the sensing block as needed. In still another embodiment, high-frequency oscillator 431 may be an external component coupled to the IC and into sensing block 430 as needed.

High-frequency oscillator 431 may be turned on and turned off by Always-On oscillator 441 which is part of Always-On block 440. Always-On block 440 may, as its name suggests, remain ON and operational whenever the device is on. Always-On block 440 may use an oscillator that is available in the devices deep sleep mode. In one embodiment, the oscillator may be an internal low-speed oscillator (ILO). In another embodiment, the oscillator may be located off-chip as an oscillator that is coupled to the device. In various embodiments, Always-On oscillator 441 may be disposed within the Always-On block 440 or it may be disposed elsewhere on the IC, such as in the system resources block 160 of FIG. 1 and routed to the Always-On block as needed.

Always-On block 440 may be run continuously and periodically power on necessary elements of the device to perform a scan of one or more electrodes. In some embodiments, Always-On block 440 may power on the entire device. In others it may power on only the sensing block, digital logic, and multiplexer control. Digital logic may also be referred to as Wake-Up Detection block 450. Wake-Up Detection block 450 may include digital logic that is capable of detecting a touch event or other such wake-up event based on the measured scan data.

Circuit 400 may also include an autonomous engine 460, which may include three sub-blocks: sequencer 462, register map (REG_MAP) 464, a random access memory (RAM) 466. RAM 466 may store data that is used for scan configuration for each sensor and mode. Data that is stored in RAM 466 may be written by a processor or CPU. In other embodiments, data may be written to RAM 466 by other sources, such as a direct memory access (DMA) circuit. REG_MAP 464 may include the specific configuration settings for circuit elements required to each scan of sensors 401.1-401.N. When the configuration is written to REG_MAP 464, sense circuits 430 may perform the scan according to the register settings. Finally, sequencer 462 may move configuration settings stored in RAM 466 to REG_MAP 464 so that scans may be initiated. Sequencer 462 may be used because a processor of CPU for the rest of the device remains in a sleep (off) state.

In operation, circuit 300 that is in always-on mode receives a clock signal (441). When the clock signal is received, the sense circuit 430 is powered on and the high frequency oscillator 431 provides clocking to the autonomous engine to being the scan. Sequencer 462 receives the clock signal (or trigger) from high frequency oscillator 431 and checks the status of the sensing circuit 430. If sense circuit 430 is available, sequencer 462 reads the first sensor configuration from RAM 466 and writes the configuration settings to REG_MAP 464, starting the scan.

Sequencer 462 monitors the status of the sense circuit 430 and, when a scan is completed, reads the result and stores the result in RAM 466, provides a trigger signal to wake-up detection block 450 to indicate that the scan is complete, and configures MUX 120 and sense circuit 430 for scanning the next sensor. This process is repeated until a scan of all sensor is complete.

Wake-up Detection block 450, after receiving the trigger signal from sequencer 462, performs detection operations based on the results of the scan of each sensor (that were scanned). If a wake-up detection is detected, the rest of the device is powered on (wakes up) and the look-for-touch scan ends. If no wake-up event is detected, sequencer 462 provides a signal to Always-On block 440 and the device is powered down while waiting for another signal from ILO 441.

Finally, circuit 400 may also include a deep sleep regulator for providing power to device components during deep sleep. Power may be used to provide clocking signals for waking the device enough to perform low-power scan operations, as described herein.

Figure 5:
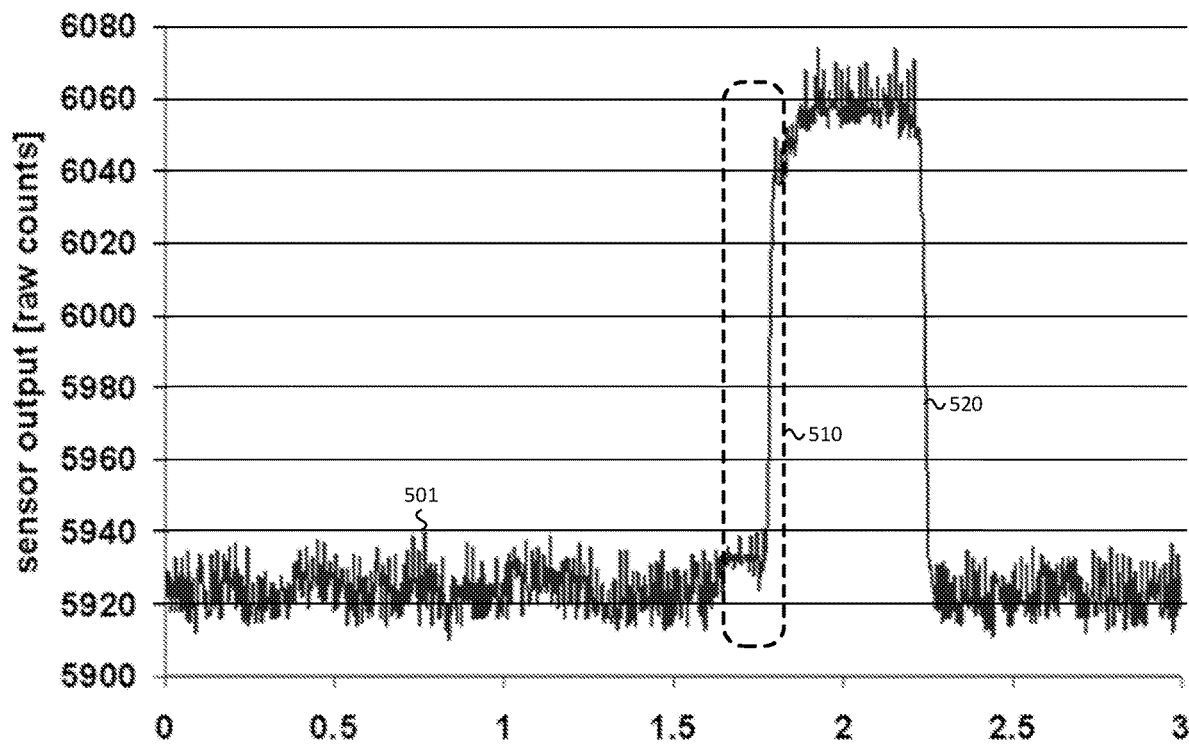
FIG. 5 illustrates an example of a change of state as manifested as digital values, according to an embodiment.

To determine if it is necessary or appropriate to transition from look-for-touch mode 211 to active mode 212, the device, using Wake-Up Detection block 450 may identify a transition in a signal received on IOs 410.1-401.N. A rising edge is an embodiment of such a transition. FIG. 5 illustrates sensor output values 501 that may be received from an IO and converted to a digital value by sensing block 430. A rising edge 510 may occur and be detected as a touch or proximity event 520 that triggers the device to enter the active mode 212.

Figure 6:
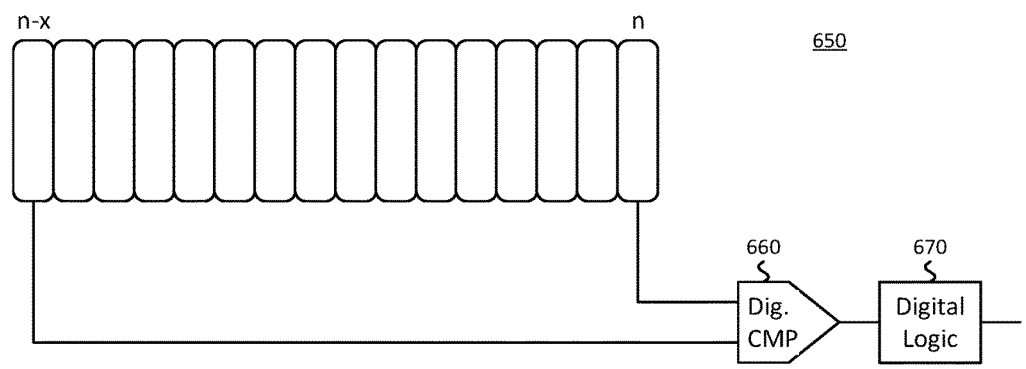
FIG. 6 illustrates an embodiment of a wake-up detection logic, according to an embodiment.

One embodiment of the digital logic of Wake-Up Detection block 450 is shown in FIG. 6, including wake-up detection logic 650. Wake detection logic 650 may store values of a plurality of scans (n-x through x) in a memory (such as memory 130 of FIG. 1). Values may be analog-to-digital conversion data for one or more electrodes 401.1-401.N scanned during operation of sensing block 430. Values may be stored in the memory as a FIFO and a digital comparator 660 may compare the last scan (n) result to a previous scan result (n-x). If the values are sufficiently different, a change in state may be detected (such as rising edge 510 of FIG. 5). The number of scans between the last scan (n) and the previous scan (n-x) may be programmable and varied.

Additionally, Wake-Up Detection logic 650 may include digital logic 670 for thresholds, hysteresis, debounce, event filters, and frequency hopping. Thresholds of digital logic may be used to ensure that wake-up events are not triggered based on noise or other spurious signals. A threshold may be used to require a minimum amount of difference between the most recent scan and the previous scan, below which no wake-up event is triggered. Hysteresis may be applied such that differences between past and current signals are ignored if they are near a difference threshold. Debounce may be used to gate triggering a wake-up event only if a minimum number of most recent scan results show a pattern. That is, a certain number of scan results must be above a previous scan result to trigger a wake-up event. Event filters may vary based on use cases and application, but in some embodiments a minimum or maximum number of sensors with the required change in scan result may be necessary to trigger a wake-up event. If there are multiple sensors, in some embodiments more than one sensor may be required to trigger a wake-up event. In another embodiment, all of the sensors may be required to trigger a wake-up event. In still another embodiment, only one or a subset of sensor may be show a change in scan result to trigger a wake-up event. If more than the prescribed number of sensors show a change, a wake-up event my not be triggered.

Figure 7:
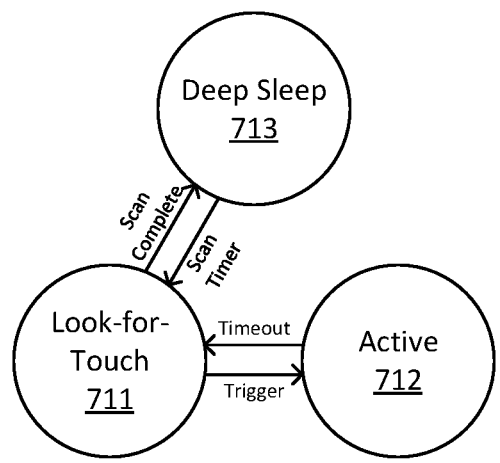
FIG. 7 illustrates a state diagram for a device with look-for-touch functionality, according to an embodiment.

FIG. 7 illustrates a state diagram for the various states of a device according to the above embodiments. A device may transition from a deep sleep state 713 to a look-for-touch state 711 based on a scan timer or an interrupt from a low-power oscillator (such as an ILO). If the scan is complete and no trigger event (rising edge) is detected by Wake-up Detection Logic 650, the device may enter the deep sleep state 713. If, while in the look-for-touch state, the device detects a trigger event (such as a rising edge), and active state 712 may be entered. The device may remain in the active state as long as sensors are detected as active (in contact with a user or otherwise detecting a proximity of an object near the sensor). Once sensors are not longer detected as active, a time-out may be reached, putting the device back into look-for-touch state 711.

Figure 8:
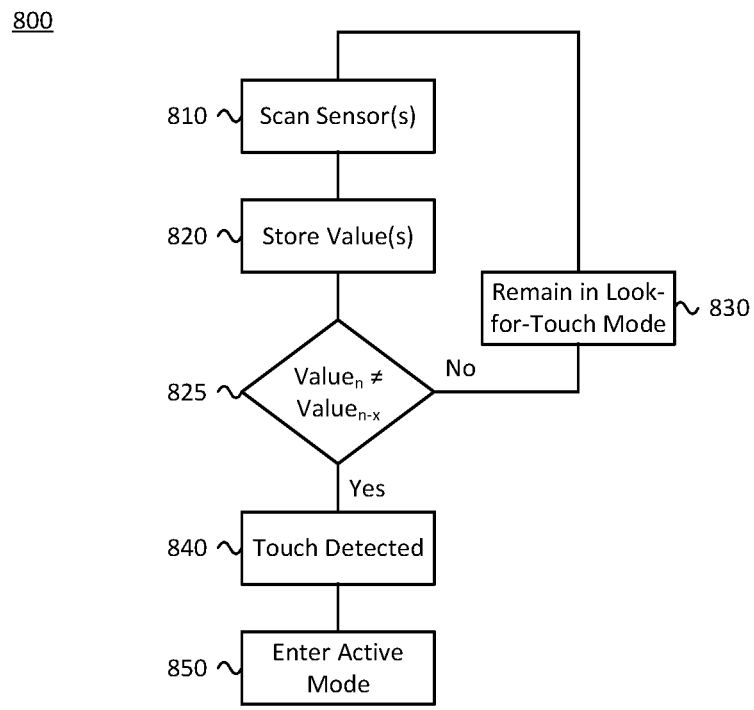
FIG. 8 illustrates a method of detecting a touch and shifting between look-for-touch and active modes, according to an embodiment.

FIG. 8 illustrates a method 800 of operating a device in look-for-touch mode and active mode. First, sensors are scanned in step 810. Scanning sensors may include converting a signal received on IOs coupled between a measurement circuit and a sensor (or sensor electrode) to a digital value. The digital value may be representative of a physical characteristic of the sensor, such as capacitance, inductance, impedance, resistance, or the like. The value for each of the scanned sensors may then be stored in a memory in step 820. Stored values may be in the memory in a FIFO configuration. The memory may store as few as two values for each sensor, or many more, depending on the system requirements. In decision step 825, the most recent scanned values may be compared to previously measured values. In various embodiments, the comparison may be to values to that are close in time or far in time, depending on the application requirements. If the value of the most recent scan is not substantially different from the previous value (considering other factors from decision logic 670), the device may remain in look-for-touch mode in step 830 and may repeat the scan of sensors in step 810. If the value of the most recent scan is substantially different from the previous value, a touch or proximity event may be detected in step 840 (considering factors from decision logic 670) and an active mode may be entered in step 850/.

Unless specifically stated otherwise, terms such as "receiving," "generating," "verifying," "performing," "correcting," "identifying," or the like, refer to actions and processes performed or implemented by computing devices that manipulates and transforms data represented as physical (electronic) quantities within the computing device's registers and memories into other data similarly represented as physical quantities within the computing device memories or registers or other such information storage, transmission or display devices.

Examples described herein also relate to an apparatus for performing the operations described herein. This apparatus may be specially constructed for the required purposes, or it may comprise a general purpose computing device selectively programmed by a computer program stored in the computing device. Such a computer program may be stored in a computer-readable non-transitory storage medium.

Certain embodiments may be implemented as a computer program product that may include instructions stored on a machine-readable medium. These instructions may be used to program a general-purpose or special-purpose processor to perform the described operations. A machine-readable medium includes any mechanism for storing or transmitting information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory; or another type of medium suitable for storing electronic instructions. The machine-readable medium may be referred to as a non-transitory machine-readable medium.

The methods and illustrative examples described herein are not inherently related to any particular computer or other apparatus. Various general purpose systems may be used in accordance with the teachings described herein, or it may prove convenient to construct more specialized apparatus to perform the required method steps. The required structure for a variety of these systems will appear as set forth in the description above.

The above description is intended to be illustrative, and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Also, the terms "first," "second," "third," "fourth," etc., as used herein are meant as labels to distinguish among different elements and may not necessarily have an ordinal meaning according to their numerical designation. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

Various units, circuits, or other components may be described or claimed as "configured to" or "configurable to" perform a task or tasks. In such contexts, the phrase "configured to" or "configurable to" is used to connote structure by indicating that the units/circuits/components include structure (e.g., circuitry) that performs the task or tasks during operation. As such, the unit/circuit/component can be said to be configured to perform the task, or configurable to perform the task, even when the specified unit/circuit/component is not currently operational (e.g., is not on). The units/circuits/components used with the "configured to" or "configurable to" language include hardware—for example, circuits, memory storing program instructions executable to implement the operation, etc. Reciting that a unit/circuit/component is "configured to" perform one or more tasks, or is "configurable to" perform one or more tasks, is expressly intended not to invoke 35 U.S.C. 112, sixth paragraph, for that unit/circuit/component. Additionally, "configured to" or "configurable to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks. "Configurable to" is expressly intended not to apply to blank media, an unprogrammed processor or unprogrammed generic computer, or an unprogrammed programmable logic device, programmable gate array, or other unprogrammed device, unless accompanied by programmed media that confers the ability to the unprogrammed device to be configured to perform the disclosed function(s).

The foregoing description, for the purpose of explanation, has been described with reference to specific embodiments. However, the illustrative discussions above are not intended to be exhaustive or to limit the invention to the precise forms disclosed. For example, while embodiments of the subject technology are described using capacitive sensors of a touch screen panel, the subject technology is not thus limited and may be applicable to other types of sensor technologies or sensor applications using other types of sensors such as inductive, magnetic, current, voltage sensors. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A device for detecting changes in physical characteristics of a sensor, the device comprising:
   a sensing circuit selectively coupled to the sensor;
   an always-on block for providing clocking and control signals in a low-power state;
   an autonomous engine for configuring the sensing circuit and storing output values from the sensing circuit; and
   a wake-up detection block for determining a state of the sensor based on the stored output values from the sensing circuit, the wake-up detection block for providing a wake-up signal to circuit elements not required for detecting changes in the physical characteristics of the sensor.

2. The device of claim 1 further comprising a high frequency oscillator for providing clocking to the sensing circuit.

3. The device of claim 2, wherein the high frequency oscillator is located within the sensing circuit.

4. The device of claim 1, wherein the always-on block receives a low-power clocking signal.

5. The device of claim 4, wherein the low-power clocking signal is an internal low-speed oscillator (ILO).

6. The device of claim 1, wherein the autonomous engine comprises:
   a register map for storing configuration settings of the sensing circuit for scanning the sensor;
   a memory for storing configuration settings for use by the register map and for storing output data from the sensing circuit; and
   a sequencer for reading configuration settings from the memory and writing them to the register map, the sequencer also for providing stored output data from the memory to the wake-up detection block.

7. The device of claim 1, wherein the wake-up detection block comprises a digital comparator for comparing at least two stored values of output data corresponding to a first scan and a previous scan.

8. The device of claim 7, wherein the wake-up detection block further comprises digital logic including at least one of thresholds, hysteresis, debounce, and event filters.

9. A system of detecting changes in state of a sensor in a low-power state, the system comprising:
   at least one sensor electrode capable of generating a signal representative of a physical characteristic; and
   a sensing device for receiving the signal from the at least one sensor electrode, the sensing device comprising:
      a sensing circuit selectively coupled to the sensor,
      an always-on block for providing clocking and control signals in a low-power state,
      an autonomous engine for configuring the sensing circuit and storing output values from the sensing circuit, and
      a wake-up detection block for determining a state of the sensor based on the stored output values from the sensing circuit, the wake-up detection block for providing a wake-up signal to circuit elements not required for detecting changes in the physical characteristics of the sensor.

10. The system of claim 9, wherein:
   the at least one sensor electrode comprises a plurality of sensor electrodes; and
   the sensing device further comprises a multiplexer for selecting at least one of the plurality of sensor electrodes to be coupled to the sensing circuit.

11. The system of claim 9, wherein the sensing device further comprises a high frequency oscillator for providing clocking to the sensing circuit.

12. The system of claim 9, wherein the always-on block receives a low-power clocking signal.

13. The system of claim 9, wherein the autonomous engine comprises:
   a register map for storing configuration settings of the sensing circuit for scanning the sensor;
   a memory for storing configuration settings for use by the register map and for storing output data from the sensing circuit; and
   a sequencer for reading configuration settings from the memory and writing them to the register map, the sequencer also for providing stored output data from the memory to the wake-up detection block.

14. The system of claim 9, wherein the wake-up detection block comprises a digital comparator for comparing at least two stored values of output data corresponding to a first scan and a previous scan.

15. A method comprising:
   scanning at least one sensor, the scanning of the at least one sensor producing a digital value representative of a physical characteristic of the sensor;
   storing the digital value to a memory;
   comparing the digital value to a previous value; and
      if the digital value is substantially different that the previous value, entering an active mode, and
      if the digital value is not substantially different than the previous value, maintaining a low-power look-for-touch mode and waiting for a signal to scan that at least one sensor again;
   wherein the scanning, storing, and comparing are completed without input from a central processing unit (CPU).

16. The method of claim 15, wherein the scanning at least one sensor comprises:
   by a sequencer, retrieving a first configuration information from a memory;
   by the sequencer, writing the first configuration information to a plurality of registers;
   by the sequencer, initiating a scan of the at least one sensor.

17. The method of claim 16, wherein the scanning at least one sensor comprises:
   by the sequencer, retrieving a second configuration information from the memory, the second configuration corresponding to a second sensor;
   by the sequencer, writing second configuration information to the plurality of registers;
   by the sequencer, initiating a scan of the second sensor.

18. The method of claim 15 further comprising, performing debounce logic on comparison of the digital value to the previous value, wherein the debounce logic is to determine if enough digital values are substantially different from the previous value.

19. The method of claim 15 further wherein the difference between the digital value and the previous value causes entry into active mode if the difference is greater than a threshold difference.

20. The method of claim 15, further wherein the difference between the digital value and the previous value causes entry into active mode if the difference is greater than a threshold difference for multiple scan operations.

* * * * *